United States Patent [19]
Gold et al.

[11] Patent Number: 4,610,070
[45] Date of Patent: Sep. 9, 1986

[54] PROCESS FOR MANUFACTURING CLAD STRIPS

[75] Inventors: Ernst Gold, Veyras, Switzerland; Erich Trägner; Dieter Lenz, both of Singen, Fed. Rep. of Germany

[73] Assignee: Swiss Aluminium Ltd., Chippis, Switzerland

[21] Appl. No.: 650,130

[22] Filed: Sep. 13, 1984

[30] Foreign Application Priority Data

Sep. 20, 1983 [CH] Switzerland ............ 5095/83

[51] Int. Cl.⁴ ............ B21D 39/03; B23P 11/00
[52] U.S. Cl. ............ 29/429; 29/514; 29/521
[58] Field of Search ............ 29/521, 505, 514, 429, 29/432, 334, 335; 428/614, 615

[56] References Cited
U.S. PATENT DOCUMENTS

| | | | |
|---|---|---|---|
| 1,687,605 | 10/1928 | Bundy | 29/33.5 X |
| 1,729,747 | 10/1929 | Palm | 29/521 UX |
| 2,763,057 | 9/1956 | Clair, Jr. | 29/521 X |

Primary Examiner—Howard N. Goldberg
Assistant Examiner—Timothy V. Eley
Attorney, Agent, or Firm—Bachman & LaPointe

[57] ABSTRACT

A process for manufacturing clad strip is such that a core strip, in particular a metal core strip, is fed to a roll gap formed by at least two rolls and is clad at least on one side by a cladding strip. In the course of the said process the cladding strip is attached to the core strip by mechanical deformation before reaching the roll gap. This takes place most usefully when a hot core strip (e.g. aluminum strip at 400°-600° C.) is to be clad with a cold cladding strip (e.g. aluminum strip at 20°-70° C.). A corresponding device for manufacturing clad strip is such that the core strip, before it enters the roll gap, is engaged above and/or below by an attachment roll, and the cladding strip is introduced between the core strip and the attachment roll.

18 Claims, 7 Drawing Figures

PROCESS FOR MANUFACTURING CLAD STRIPS

BACKGROUND OF THE INVENTION

The invention relates to a process for manufacturing clad strips in which a core strip, in particular of metal, is fed to a roll gap formed by at least two rolls and is clad with a cladding strip on at least one side, and relates also to a device for this purpose.

Processes for cladding in particular metal strips find application for example when a lower grade core material is to be provided with a thin layer of high grade material. The lower quality of the core material can be due to the alloy used. This includes alloys which contain a large fraction of recycled scrap as the amount of the various elements present and their distribution vary considerably. The lower quality of the core material can also be due to the irregular roughness of the as-cast surface, for example as in strips produced on continuous casting machines.

As the surface properties of strip material are often decisive in many applications, cladding processes find frequent use.

Whereas, for example, cast slabs have cladding sheets of plates laid or welded on to them and are joined to them by pre-heating and rolling, in the case of cast strip one requires a synchronously running facility for feeding the cladding material to the cast strip. As such it is of no consequence whether these strips are rolled out from a coiler used as an intermediate storage means, or come from the strip casting unit directly. Known for the cladding of such strips are arrangements in which a cladding strip is led via feeding rolls to a unit where it is laid on top of the core material. After passing through a preheating zone, the two materials enter a roll gap of a hot rolling mill. It has been found disadvantageous here that the cladding strip, due to its relatively long contact time with the core material, enters the roll gap at approximately the same temperature as the core material. The hot forming characteristics of both materials are about the same in that case with the result that no relative movement takes place between the core and the cladding material i.e. a movement which would help achieve optimal welding together of the two materials. Also, in high grade cladding material undesirable grain growth takes place, an effect which becomes all the more undesirable the longer the duration of contact between the core and cladding material in the area between the point of first contact and the roll gap. High grade products on the other hand are exactly those products which require a very fine grain.

Furthermore it has been noted that distortion, at least of the cladding material, takes place between the point of first contact and the roll gap due to differences in thermal expansion so that it is no longer possible to achieve proper alignment of the two component materials, and blisters can form due to the entrapment of air i.e. an effect which has a negative effect on the bond strength due to a reduction of the area where the core and cladding materials are bonded together.

For example in the manufacture of strips made of an aluminum alloy with a high concentration of magnesium the as-cast strip acquires an oxide skin on route from the caster to the hot rolling mill which makes it difficult to bond the cladding material to the core material. The greater this distance, especially if a preheating zone is provided, the more disturbing is the growth of the oxide skin. This oxide skin should therefore be removed as much as possible in order to allow diffusion bonding between the materials in the roll gap.

The object of the present invention is therefore to develop a process and device of the kind mentioned at the start wherein the above mentioned disadvantages are avoided. Furthermore the surface properties of the end product and the bond strength between the cladding and the core material should be improved.

SUMMARY OF THE INVENTION

This object is achieved by way of a process in which the cladding strip is attached to the core material by mechanical deformation before the said materials reach the roll gap.

This attachment should hold sufficiently long until the cladding strip, together with the metal core, is engaged by at least one roll. To this end the attachment is carried out close to the roll gap so that the time of contact between the metal core and the cladding strip is very short. As soon as the attachment step has been completed no more contact takes place before the roll gap. This process should according to the invention be applicable to the cladding of a core strip of any kind of material with a cladding strip likewise of any kind of material. Preferably, however, it finds application in the cladding of a metal strip with another metal strip.

As the metal strip which is to be clad comes directly out of the casting unit, it has a temperature which is much higher (e.g. with aluminum 400°–600° C.) than that of the cladding strip (e.g. with aluminum 20°–70° C.). Due to the difference in temperature the two materials have very different $K_f$ values i.e. different resistance to shaping or working. As a result no purely diffusion type of bonding takes place, instead this occurs by a friction induced attachment. Better bonding between the two strips is produced according to the invention by roughening the surface of the metal strip before the attachment step.

The absence of contact between cladding strip and metal core strip prior to entering the roll gap after the attachment step means that no change in grain size occurs in the cladding strip. This is particularly advantageous when manufacturing high grade finished or semi-finished products.

A device for manufacturing clad strip from at least one cladding strip and a metal core strip which comes for example from a strip caster, coil or the like and is fed to a roll gap between at least two rolls where it is deformed, is such that before the core strip enters the roll gap it is engaged above and/or below by an attachment roll and the cladding strip is inserted between the core strip and the attachment roll. The outer surface of the attachment roll should feature projections which press the cladding strip into the core strip thus mechanically attaching the strips to each other. A similar effect is achieved by providing the outer surface of that roll with, in cross section, triangular shaped circumferential strips which project out of the roll surface and likewise embed themselves temporarily in the cladding strip. This device is not restricted in its use only to metal cladding and core strips, but can be employed for cladding any material of choice with another material of choice.

The attachment rolls should be arranged such that, after the core and cladding strips have entered the roll gap, they can be withdrawn from the strip in order that a specific angle is achieved between the cladding strip and the core strip. One feature which is achieved by this is that the feeding of the cladding strip is performed by the rolls themselves and can be regulated in synchrony with the movement of the metal core strip. Further means of regulation are unnecessary. If for example the cladding material is being unwound from a coil, a degree of back tension can be produced between the coil and the roll gap due to the inertia of the uncoiler. If necessary, however, a breaking mechanism can be provided on the uncoiler. This, together with the fact that no thermal stresses are created ahead of the roll gap, ensures that no distortion of the cladding strip takes place.

Furthermore, in accordance with the invention, brushes for roughening the surface of the core strips are provided upstream of the attachment rolls. These brushes break up the oxide skin on the strip. Also no oxide skin can reform in the short interval, approximately 60 seconds, between the brushes and the roll gap. This, the different $K_f$ values and the fact that the direct feeding of the cladding strip into the roll gap prohibits air entrapment, causes excellent diffusion bonding and friction-induced attachment to take place between the cladding and metal core strips.

The brushes, the attachment rolls and the adjacent hydraulic drive facilities are preferably mounted in a supporting frame which also bears the coiled cladding strips.

This device is extremely simple in design and functions with only very few mechanical or electrical components. For this reason its susceptibility to breaking down is very low.

BRIEF DESCRIPTION OF THE DRAWINGS

Further advantages, features and details of the invention are revealed in the following description of a preferred exemplified embodiment and with the help of the drawings viz.

DETAILED DESCRIPTION

Figure 1:
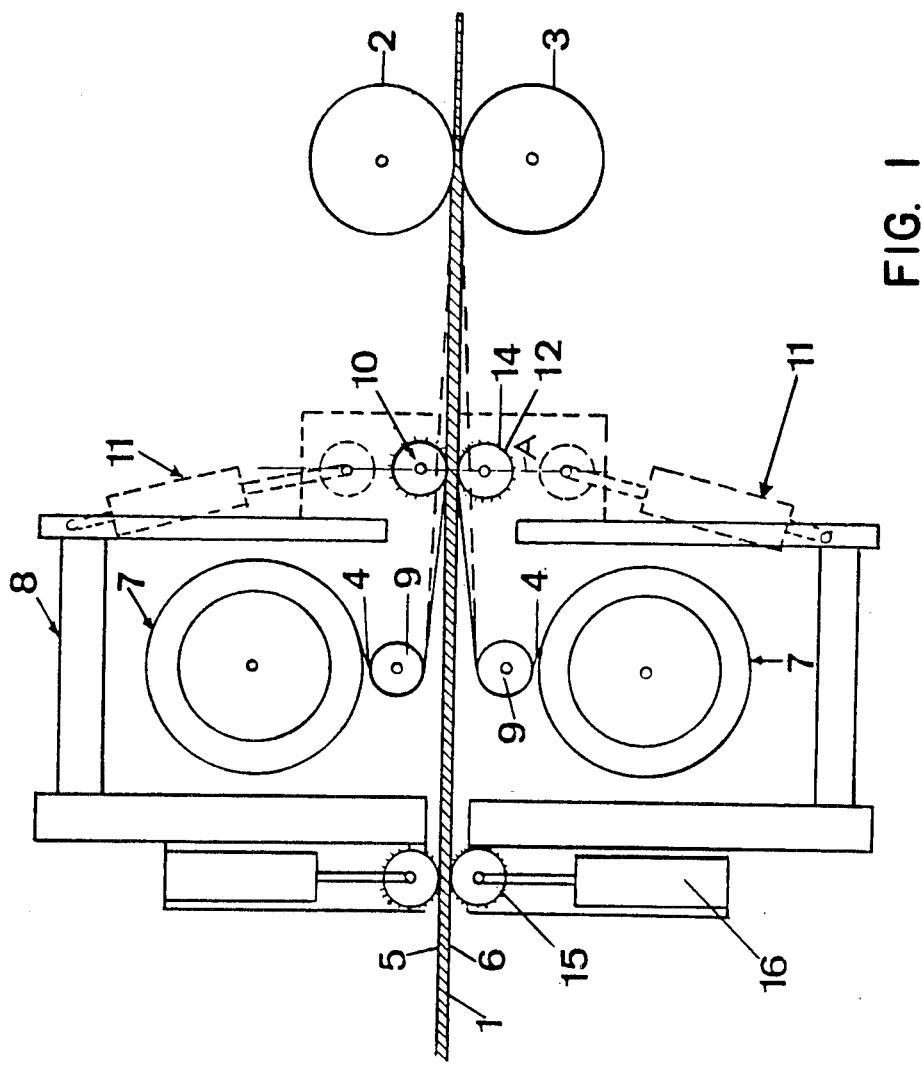
FIG. 1: A schematic representation of a facility for cladding a metal strip.

A facility for cladding a metal strip 1 is such that the core strip 1 is led from, not shown here, a continuous strip caster, coil or the like to a rolling device of which for reasons of simplicity only two rolls 2 and 3 are shown.

Between the strip caster or coil or the like and the rolling device a strip 4 is fed to the core strip 1 for cladding to it, if desired to the upper side 5 and the lower side 6 of the said strip 1. This cladding strip is coiled in rolls 7 supported in a frame 8, the desired uncoiling direction being dictated in advance by the deflection rolls 9.

Figure 2:
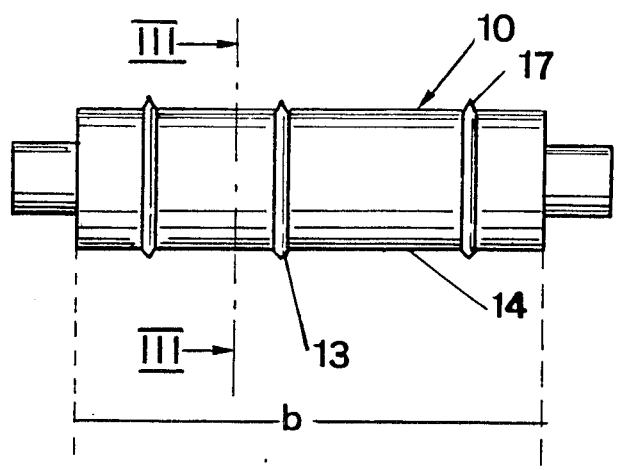
FIG. 2: A front elevation of an attachment roll.
Figure 3:
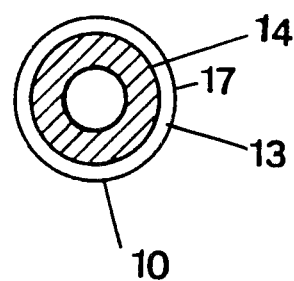
FIG. 3: A cross section through an attachment roll as shown in FIG. 2, sectioned along line III—III.
Figure 4:
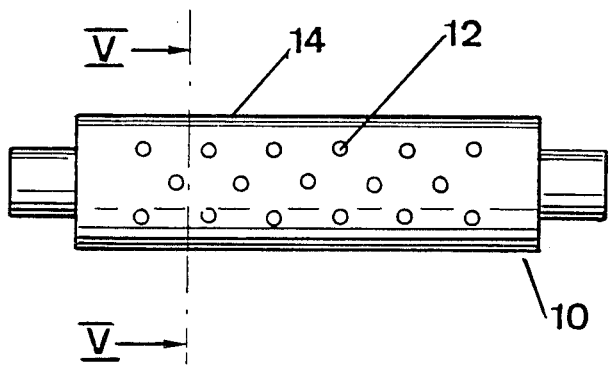
FIG. 4: A further version of an attachment roll.
Figure 5:
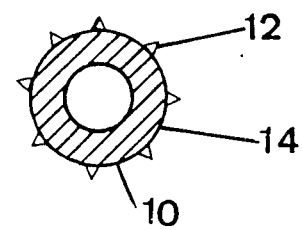
FIG. 5: Cross section through the attachment roll shown in FIG. 4, sectioned along line V—V.

Also supported by the frame 8 and situated on both sides of the metal strip 1 are attachment rolls 10 which can be moved along a line A by means of hydraulic facilities 11, indicated here by broken lines. As shown in FIG. 2 an attachment roll 10 is preferably of breadth b, which corresponds with the width of the metal strip 1. The outer surface 14 of the roll 10 features projections 12 (FIGS. 4, 5) which locally press the cladding strip 4 into the core strip 1. Instead of or in addition to these projections 12 are projecting circumferential strips 13 which are triangular shaped in cross section and are able to push their running knife-edge into the cladding strip (FIGS. 2 and 3).

At the start of the cladding process the attachment rolls 10 press the cladding strips 4 on to the metal strip 1. In doing so the projections 12 or strips 13 produce intimate contact between both strips 1 and 4. This attachment procedure can, if desired, be performed until the core strip 1, along with the attached cladding strip 4, enters a roll gap of width $h_2$ formed by the rolls 2 and 3. After this the attachment rolls 10 are withdrawn by means of the hydraulic facility 11 (indicated by broken lines), and the cladding strips 4, directly and in synchrony with the core strip 1, drawn from the coils 7 such that the strips 4 enter the roll gap and are subjected to the cladding step without making prior contact with the core strip 1.

As shown in FIG. 1 prior to the attachment rolls 10 on the supporting frame 8 there are rotating brushes 15 which can be moved by a drive mechanism 16. These serve to roughen the surface of the metal strip 1.

Figure 6:
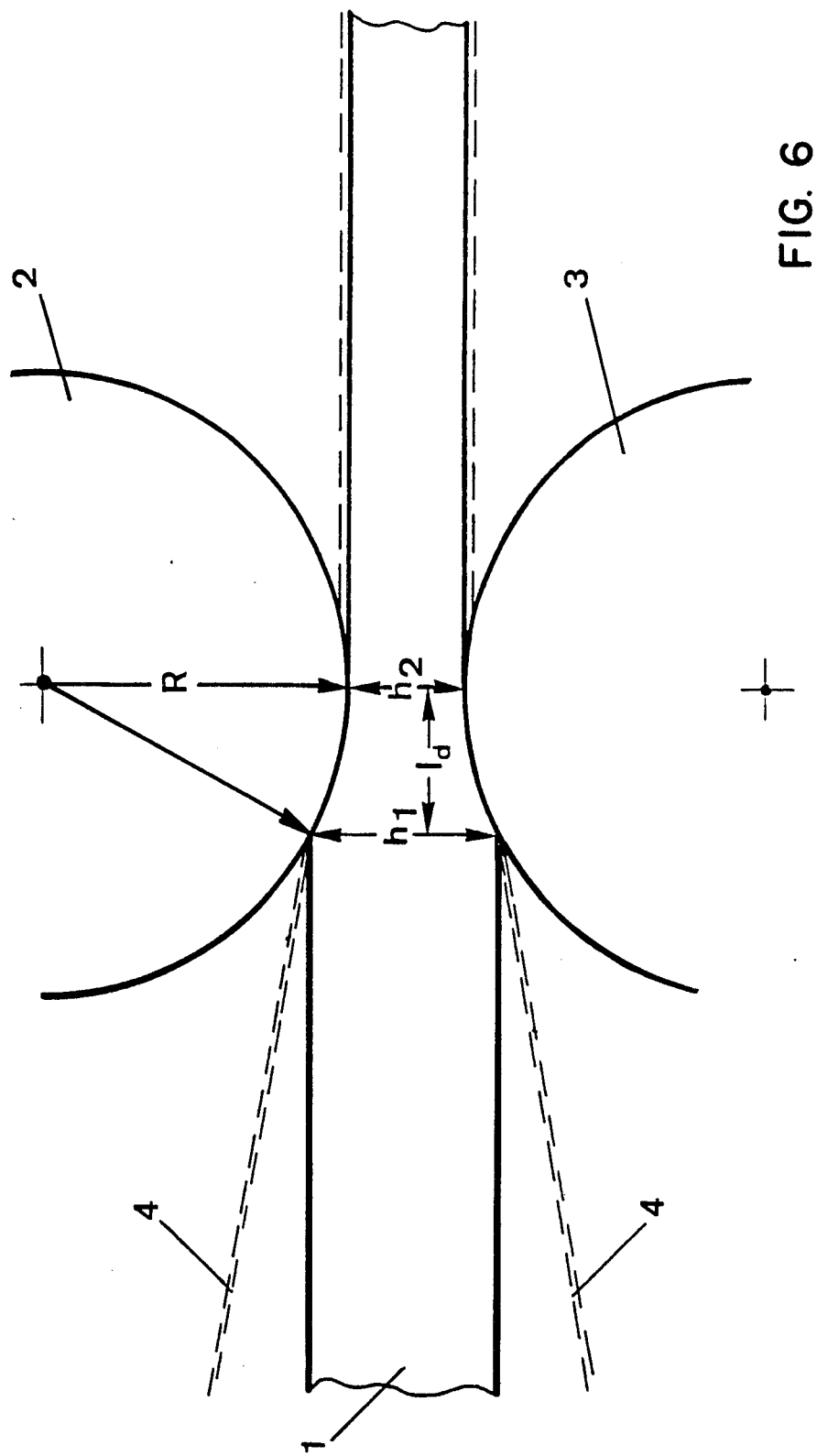
FIG. 6: An enlarged detail of part of the facility shown in FIG. 1.

As shown in FIG. 6 the cladding strip 4 meets the core strip 1 at an angle. The distance between the points where the core strip 1 together with the cladding strips 4 touches the rolls 2 and 3 is indicated as $h_1$, and the distance between $h_1$ and the width $h_2$ of the roll gap as $l_d$. As such $l_d$ is the distance over which the strips are compressed by the rolls, and this is determined by the parameter $(h_1 - h_2) \times R$ where R is the roll radius. Due to their different starting conditions (soft, hard, half-hard etc.) and different temperatures (in the case of aluminum: cladding=20° C., core strip 520° C.) the cladding material 4 and the core strip 1 exhibit very different forming characteristics on entry into the roll gap. The characteristic describing this is the so-called $K_f$ value i.e. the resistance to deformation of the material.

Figure 7:
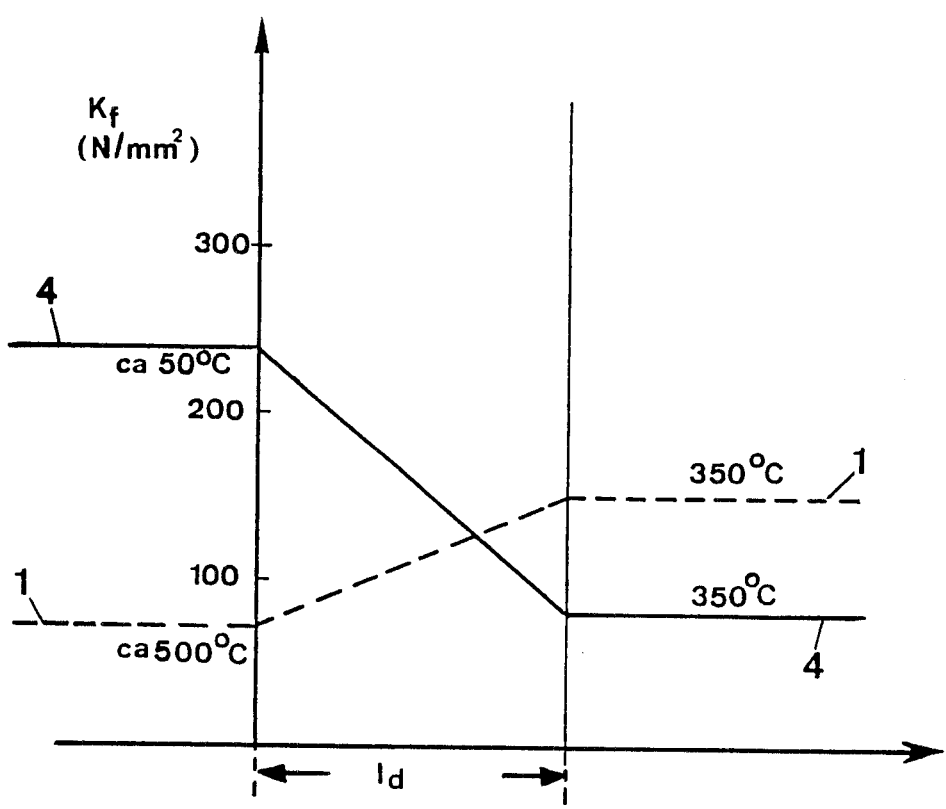
FIG. 7: A graphical representation of a change-over in $K_f$ values.

FIG. 7 shows an example of a change in $K_f$ values experienced by a pair of aluminum alloys rolled together. An aluminum cladding strip 4 in the hard rolled state has a $K_f$ value of about 240 N/mm² as it enters the roll gap at room temperature. During the cladding process the $K_f$ value of that strip 4 "changes" within the deformation zone $l_d$ and the temperature rises considerably (300°–600° C.). On leaving the roll gap this value is about 80 N/mm².

The core strip 1 (here aluminum) on the other hand experiences a change in $K_f$ value in the opposite manner. On entry into the roll gap at approximately 400°–600° C. its $K_f$ value is about 70 N/mm². Over the distance $l_d$, due to the fall in temperature and the deformation it experiences this "changes" to about 150 N/mm². These counter running processes constitute a "switch-over" in $K_f$ value.

By appropriate adjustment in terms of alloy composition, starting condition and temperature it is possible to achieve optimum attachment conditions between the cladding strip 4 and the core strip 1 whereby the maximum possible difference in $K_f$ values of the cladding and core strips can be achieved over the distance $l_d$. This produces a pronounced relative movement between the cladding strip 4 and the core strip 1 which leads to distruption of the oxidized surface and permits diffusion bonding and friction induced attachment of the two metal strips to each other.

What is claimed is:

1. Process for manufacturing clad strips which comprises: providing a core strip and a cladding strip; forming a composite by rolling together said core and cladding between cladding rolls; attaching the cladding strip to the core strip by mechanical deformation by attachment rolls upstream of said cladding rolls; and introducing said attached material into a roll gap formed by at least two of said cladding rolls to roll and deform the attached material and form a clad strip, wherein the attachment process is at most carried out until the attached material is engaged by the roll gap of the cladding rolls and withdrawing the attachment rolls after the attached material is engaged by said roll gap.

2. Process according to claim 1 wherein said core strip is a metal strip.

3. Process according to claim 2 wherein said core is clad on one side.

4. Process accoding to claim 2 wherein the cladding strip is a metal strip.

5. Process according to claim 2 wherein the attachment step is adjacent the roll gap of the cladding rolls so that the time of contact of core and cladding before the roll gap is short.

6. Process according to claim 1 wherein the surface of the core strip is roughened before the attachment step.

7. Process according to claim 1 wherein a hot core strip is clad with a cold cladding strip.

8. Process according to claim 5 wherein the hot core strip is aluminum at a temperature of 400°–600° C. and the cold cladding strip is aluminum at a temperature of 20°–70° C.

9. Device for manufacturing clad strips which comprises: a source of core strip and a source of cladding strip; attachment roll means for attaching the cladding strip to the core strip by mechanical deformation including at least one attachment roll which engages the core and cladding strips; a roll gap formed by at least two cladding rolls downstream of said attachment means for rolling and deforming said attached material into a clad strip; and means linked to the attachment roll operative to move the attachment roll away from the core and cladding strips after said attached material engages said deformation rolls.

10. Device according to claim 9 wherein said core strip is a hot metal strip.

11. Device according to claim 9 wherein said cladding strip is at least one metal strip.

12. Device according to claim 9 wherein the attachment roll features projections on its outer surface operative to mechanically attach the strips to each other.

13. Device according to claim 12 wherein said projections comprise circumferential projecting strips which are triangular shaped in cross section and which are operative to embed themselves in the cladding strip.

14. Device according to claim 9 wherein said linked means is a hydraulic unit.

15. Device according to claim 14 including brushes for roughening the surface of the core strip provided in line upstream of the attachment roll.

16. Device according to claim 15 including at least one coil roll for supporting said cladding strip.

17. Device according to claim 15 including a supporting frame which supports the brushes, attachment roll, the hydraulic unit and coil roll.

18. Device according to claim 17 including a deflection roll for said cladding strip downstream of said coil roll.

* * * * *

UNITED STATES PATENT AND TRADEMARK OFFICE
CERTIFICATE OF CORRECTION

PATENT NO. : 4,610,070

DATED : September 9, 1986

INVENTOR(S) : ERNST GOLD ET AL.

It is certified that error appears in the above–identified patent and that said Letters Patent are hereby corrected as shown below:

In Column 5, claim 4, line 21, change "accoding" to read ---according---.

In Column 5, claim 8, line 31, change the dependency from "claim 5" to ---claim 7---.

Signed and Sealed this

Eleventh Day of November, 1986

*Attest:*

DONALD J. QUIGG

*Attesting Officer*      *Commissioner of Patents and Trademarks*